J. McCREARY.
Gate.
No. 64,548.
Patented May 7, 1867.
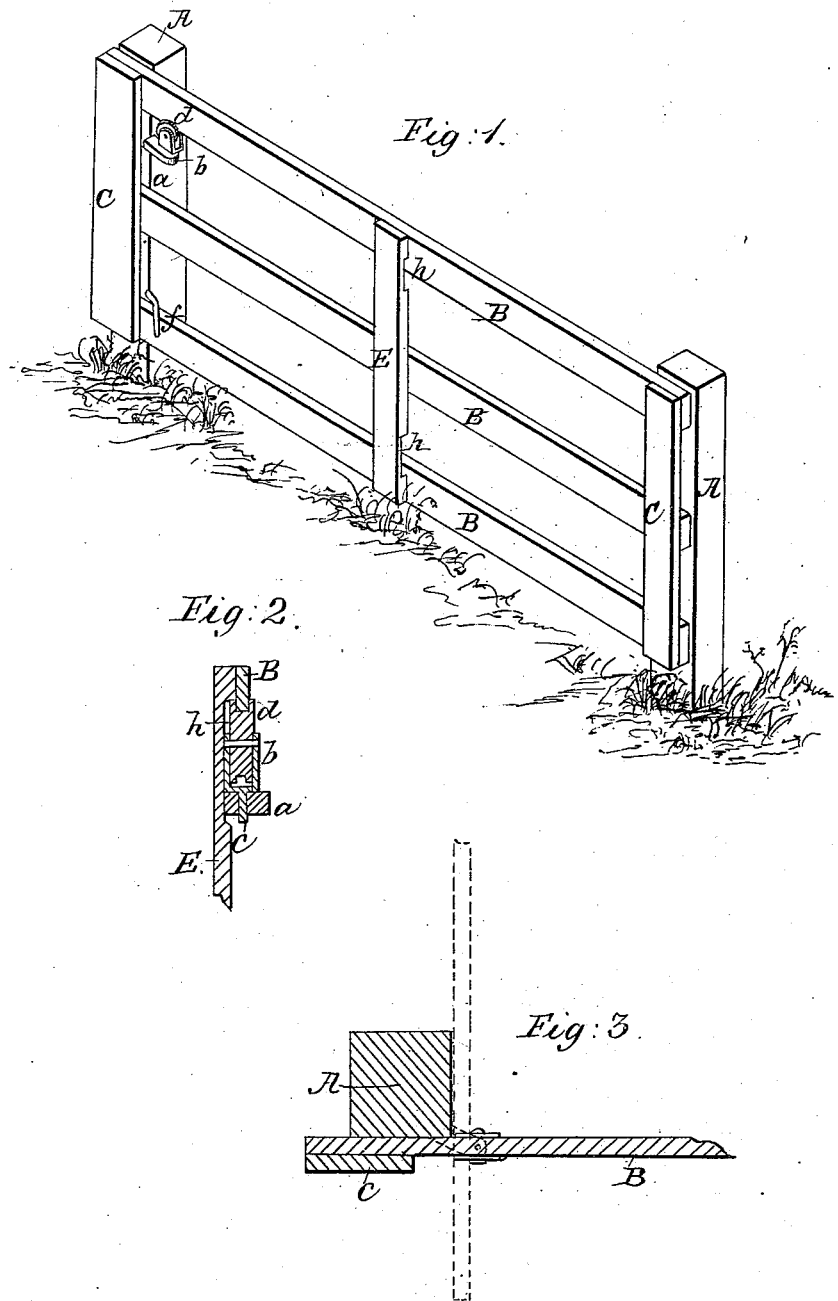

United States Patent Office.

JOHN McCREARY, OF MIDDLETOWN, PENNSYLVANIA.

Letters Patent No. 64,548, dated May 7, 1867.

IMPROVEMENT IN GATES.

The Schedule referred to in these Letters Patent and making part of the same.

TO ALL WHOM IT MAY CONCERN:

Be it known that I, JOHN McCREARY, of Middletown, in the county of Dauphin, and State of Pennsylvania, have invented certain new and useful Improvements in Gates; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in constructing a gate having a cross-bar in its centre, and which, while mounted on a swivelled roller, can be moved nearly its entire length in opening or closing it.

Figure 1 is a perspective view of the gate closed.

Figure 2 is a vertical section of a portion representing the gate half way open.

Figure 3 is a top plan view of a portion.

Many forms of gates have been devised to move part way back and turn on a swivelled roller, and in some instances to move entirely back on a roller; but, in this latter case, the central cross-bar E has to be omitted in gates as usually constructed, as said bar, coming in contact with the roller, prevents the gate from being run entirely back. By my improvement the cross-bar at the centre is retained, and the gate so constructed as to be run clear back.

I construct my gate of boards B, with cross-bars or strips C nailed securely at each end. I then nail a cross-bar, E, across the centre, as shown in fig. 1, first cutting away the under side of said bar E at the points represented at $h$ of figs. 1 and 2. I then provide a flanged roller, $d$, which is mounted in a frame, $b$, from the bottom of which projects a central round stem, $c$, which fits loosely in a hole made in the short metal bar or support, $a$, as shown more clearly in fig. 2. The support $a$ is driven into the post A in such a manner as to leave its outer end protruding therefrom at an angle of forty-five degrees from the face of the post, as represented by the dotted lines in fig. 3. The gate is suspended by its upper board B on the roller $d$, as shown in figs. 1 and 2, and a right-angled hook, $f$, is then driven diagonally into the post A, just above the lower board B, as shown in fig. 1, so as to have its bent or vertical arm engage over the outside of the board, and thus keep the bottom of the gate close up against the post. This hook $f$ also prevents the gate from being raised or removed from the roller $d$.

It will be seen that when the gate is moved back so as to bring the central cross-bar E back to the roller, the recesses $h$ permit it to pass by both the roller and the hook $f$ without hindrance, and thus the gate, while being strengthened by the cross-bar, can be run entirely back. If preferred, the cross-bar E, instead of being cut away as described, may have a block or small piece of board interposed between it and the boards B, in order to form the recesses for the passing of the roller and the hook, and thus produce the same results. As the support $a$ and the hook $f$ both protrude diagonally from the post A the gate can, if desired, be turned at a right angle, as indicated in red in fig. 3, whether wholly or partially opened.

Having thus described my invention, what I claim, is—

A gate having a central cross-bar, E, with the recesses formed on its inner surface, when used in combination with the grooved and swivelled roller $d$ and the right-angled hook $f$, substantially as shown and described.

JOHN McCREARY.

Witnesses:
J. SCHAEFFER,
A. J. SCHAEFFER.